(12) United States Patent
Zyada et al.

(10) Patent No.: US 11,459,995 B1
(45) Date of Patent: Oct. 4, 2022

(54) COMBUSTION ENGINE MODE OPTIMIZATION

(71) Applicants: Hyundai Motor Company, Seoul (KR); Kia Corporation, Seoul (KR)

(72) Inventors: Antowan Zyada, Superior Township, MI (US); Kyoung Pyo Ha, Gyeonggi-do (KR); Shengrong Zhu, Superior Township, MI (US); Philip Zoldak, Superior Township, MI (US); Jeffrey Hollowell, Superior Township, MI (US); Mark Shirley, Albion, MI (US); Nicholas Fantin, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/569,068

(22) Filed: Jan. 5, 2022

(51) Int. Cl.

| F02D 41/30 | (2006.01) |
|---|---|
| F02P 15/00 | (2006.01) |
| F02D 41/38 | (2006.01) |
| F02D 13/02 | (2006.01) |
| F02P 21/00 | (2006.01) |

(52) U.S. Cl.
CPC .......... F02P 15/00 (2013.01); F02D 13/0215 (2013.01); F02D 41/38 (2013.01); F02P 21/00 (2013.01); *F02D 2041/389* (2013.01); *F02D 2200/101* (2013.01); *F02D 2200/1002* (2013.01)

(58) Field of Classification Search
CPC ....... F02P 15/00; F02P 21/00; F02D 13/0215; F02D 41/38; F02D 2041/389; F02D 2200/101; F02D 2200/1002
USPC .............. 123/305, 435, 90.15; 701/103–105, 701/110–111
See application file for complete search history.

(56) References Cited

U.S. PATENT DOCUMENTS

| 6,907,870 B2 | 6/2005 | zur Loye et al. |
| 7,240,659 B2 | 7/2007 | Yang |
| 8,955,492 B2 | 2/2015 | Wermuth et al. |
| 10,550,790 B2 | 2/2020 | Ravi et al. |
| 2019/0178115 A1 | 6/2019 | Son et al. |

FOREIGN PATENT DOCUMENTS

WO 2009-023388 A1 2/2009

*Primary Examiner* — Hai H Huynh
(74) *Attorney, Agent, or Firm* — Fox Rothschild LLP

(57) ABSTRACT

Methods and systems are described for combustion engine mode optimization. The system includes a combustion engine, a fuel delivery system, and a controller communicatively coupled to the combustion engine and the fuel delivery system. The controller selects a low temperature combustion mode based on the combustion engine being warmer than a predetermined temperature and low load conditions on the combustion engine. The low temperature combustion mode includes instructions that reduces an intake valve opening duration and an exhaust valve opening duration. The controller reduces the intake valve opening duration and the exhaust valve opening duration to create a delay between an intake valve opening duration and an exhaust valve opening duration in response to selecting the low temperature combustion mode. The delay increases a residual gas temperature in the combustion chamber and induces auto-ignition of fuel in the combustion chamber.

20 Claims, 10 Drawing Sheets

| Scenario | Actions |
|---|---|
| 101<br>SI → LTC-NVO | ■ Open up throttle to lean out mixture while reducing valve overlap from PVO to NVO to increase trapping in-cylinder hot residuals from previous engine cycle, in turn, mixture temperature.<br>■ Adjust DI SOI and amount, VGT, CAH, NVO to have stable combustion by monitoring CA50 while maintaining the requested torque.<br>■ Spark may be kept to have more stable LTC |
| 102<br>LTC-NVO → GDF | ■ Adjust valve overlap from NVO to PVO to increase trapped air.<br>■ Adjust intake air temperature, boost, EGR, and increase DI and use multiple injections with late SOI. |
| 103<br>GDF → LTC-NVO | ■ Reduce valve overlap from PVO to NVO to increase in-cylinder hot residuals and mixture temperature while adjusting fuel injection from multiple late DI to early fuel injection with low fuel injection pressure.<br>■ Adjust intake air temperature, boost, and EGR to have stable combustion by monitoring CA50 while maintaining the requested torque. |
| 104<br>LTC-NVO → SI | ■ Perform spark starting with a late timing of said +10CAD, while increasing valve overlap from NVO to PVO<br>■ adjust throttle, fuel injection timing, spark timing, intake air temperature, EGR to have stable combustion by monitoring CA50 while maintaining the requested torque. |
| 105<br>SI → GDF | ■ Open up throttle, adjust boost, intake air temperature, and the fuel injection quantity and timing from early low pressure injection to high pressure multiple late injection, to generate stratified fuel distribution and auto ignition, by monitoring CA50.<br>■ Retard spark timing and turn off spark when it does not affect CA50. |
| 106<br>GDF → SI | ■ Adjust throttle and boost.<br>■ Perform spark starting with a late timing of said +10CAD, and adjust spark timing by monitoring CA50, while changing fuel injection to early fuel injection from late fuel injection until the late fuel injection is turned off. |

FIG. 7

COMBUSTION ENGINE MODE OPTIMIZATION

TECHNICAL FIELD

The present disclosure relates generally to internal combustion engines, and more particularly, to combustion engine mode optimization using multiple distinct combustion modes.

BACKGROUND

Internal combustion engines commonly use an electric spark to ignite fuel inside of a combustion chamber. The spark enables the internal combustion engine to convert chemical energy found in fuel to mechanical energy. However, engines with spark ignition have a low combustion efficiency in comparison to diesel engines. Even more troublesome, the combustion efficiency for spark-ignited engines is worse at low load conditions in comparison to diesel engines. While diesel engines are more energy efficient at low load conditions, diesel engines also have a variety of drawbacks. For example, diesel compression ignition engines produce high NOx emissions and generate more soot in comparison to spark-ignited engines. Currently, both types of internal combustion engines have energy efficiency and emissions drawbacks.

SUMMARY

The present disclosure provides methods, systems, articles of manufacture, including computer program products, for internal combustion engine optimization.

In one aspect, there is provided a system including a combustion engine, a fuel delivery system, and a controller communicatively coupled to the combustion engine and the fuel delivery system. The controller is configured to select a low temperature combustion mode based on the combustion engine being warmer than a predetermined temperature and low load conditions on the combustion engine. The low temperature combustion mode includes instructions that reduces an intake valve opening duration and an exhaust valve opening duration. The controller is configured to reduce the intake valve opening duration and the exhaust valve opening duration to create a delay between an intake valve opening duration and an exhaust valve opening duration in response to selecting the low temperature combustion mode. The delay increases a residual gas temperature in the combustion chamber and induces auto-ignition of fuel in the combustion chamber.

In some variations, the delay traps burned combustion gases in the combustion chamber inducing an increased compression temperature and the auto-ignition of fuel is induced at a delayed compression stroke. Additionally, the low load conditions are indicative of an engine speed less than a predetermined engine speed and an engine torque less than a predetermined engine torque, the auto-ignition of fuel does not require a spark in the combustion chamber. In some variations, a spark ignition mode is selected based on the combustion engine being colder than the predetermined temperature and the low load conditions on the combustion engine, the spark ignition mode including instructions to apply a spark to combust fuel in the combustion chamber, and in response to the combustion engine being warmer than the predetermined temperature, the low temperature combustion mode is selected. In some variations, a diffusion flame mode is selected including instructions to apply direct injection of fuel into the combustion chamber for compression ignited combustion in response to high load conditions on the combustion engine, the high load conditions being indicative of an engine speed greater than a predetermined engine speed and an engine torque being greater than a predetermined engine torque.

Further, the intake valve opening duration and the exhaust valve opening duration is increased to reduce the delay between the intake valve open duration and the exhaust valve open duration, wherein an intake valve displacement and an exhaust valve displacement in the diffusion flame mode are greater than the intake valve displacement and the exhaust valve displacement in the low temperature combustion mode. In some variations, the diffusion flame mode increases air trapped in the combustion chamber in comparison to the low temperature combustion mode, reduces fuel viscosity in comparison to the low temperature combustion mode, and increases fuel spray atomization and vaporization in comparison to the low temperature combustion mode.

In some variations, a diffusion flame mode is selected including instructions to apply direct injection for compression ignited combustion, and, in response to the low load conditions on the combustion engine, the low temperature combustion mode is selected including instructions to reduce an overlap time duration in which the intake valve open duration overlaps with the exhaust valve open duration. In some variations, a spark ignition mode is selected based on low load conditions and the combustion engine being colder than the predetermined temperature; and in response to selecting the low temperature combustion mode, an overlap time duration is reduced in which the intake valve open duration overlaps with the exhaust valve open duration. In some variations, air entering the combustion chamber is increased and a direct injection timing and a direct injection amount is adjusted in response to selecting the low temperature combustion mode. Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer-implemented methods consistent with one or more implementations of the current subject matter may be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 depicts an example of a table representative of the changes in combustion operation as the engine transitions from one combustion mode to another;

DETAILED DESCRIPTION

Figure 1:
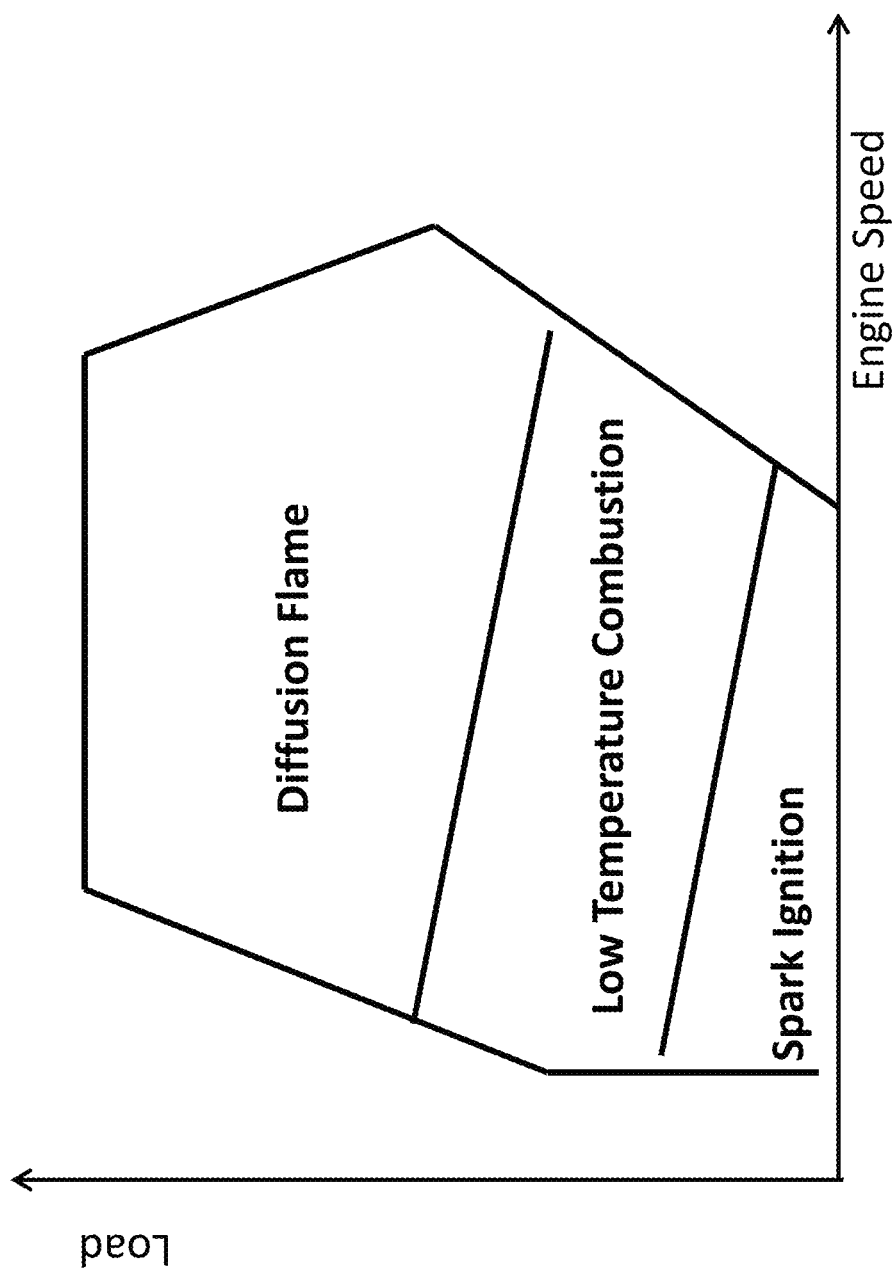
FIG. 1 depicts an example of a graph representative of three modes of operation for an engine according to engine speed and load.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present embodiments may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to the present disclosure, an internal combustion engine may be optimized based on a combustion mode. The combustion mode may be selected by a controller communicatively coupled to the combustion engine. The controller may be configured to select between one of three combustion modes: a spark ignition mode, a low temperature combustion mode, and a diffusion flame mode. The controller may be configured to select a mode based on the engine temperature satisfying a temperature threshold or on low load conditions on the engine. The low load conditions may be indicative of an engine speed being less than a predetermined engine speed or an engine torque being less than a predetermined engine torque.

The spark ignition mode may include instructions to apply a spark to combust fuel in the combustion chamber. The spark ignition mode may be selected by the controller based on the combustion engine being colder than a predetermined temperature or on low load conditions on the combustion engine.

The low temperature mode may include instructions to increase a delay between an intake valve opening duration and an exhaust valve opening duration. The delay may trap burned combustion gases in the combustion chamber and induce an increased compression temperature. The increased compression temperature may induce an auto-ignition of fuel at a delayed compression stroke. The low temperature combustion mode may be selected based on low load conditions of the combustion engine and the engine temperature satisfying a threshold engine temperature.

The diffusion flame mode may include instructions to apply direct injection of fuel into the combustion chamber for compression-ignited combustion. The diffusion flame mode may be selected by the controller based on the engine speed being greater than a predetermined engine speed or an engine torque being greater than a predetermined engine torque. The diffusion flame mode may increase air trapped in the combustion chamber in comparison to the low temperature combustion mode.

The combustion modes may alter a time duration for which an intake valve is open or an exhaust valve is open. The combustion modes may cause an overlap in time for when the intake valve is open and the exhaust valve is open.

In other words, the combustion modes may extend the intake valve open duration and the exhaust valve open duration such that the intake valve duration and the exhaust valve open duration overlap in time. Additionally, the combustion modes may shift the timing of the intake valve open duration and the timing of the exhaust valve open duration such that an overlap in time exists between when the intake valve closes and when the exhaust valve opens.

Alternatively, the combustion modes may create a delay in time between when the intake valve closes and the exhaust valve opens. In other words, the combustion modes may decrease the intake valve open duration and the exhaust valve open duration such that a time delay exists between the intake valve duration and the exhaust valve open duration. Additionally, the combustion mode may shift the timing of the intake valve open duration and the timing of the exhaust valve open duration such that a delay in time exists between when the intake valve closes and when the exhaust valve opens.

The methods, systems, apparatuses, and non-transitory storage mediums described herein select an engine mode of operation based on engine conditions. The various embodiments also increase or decrease a delay between an intake valve opening duration and an exhaust valve opening duration.

FIG. 1 depicts an example of a graph representative of three modes of operation for an engine according to engine speed and load. A controller may be configured to select between different modes of engine operation. The controller may be communicatively coupled to the combustion engine. The controller may be communicatively coupled to a memory storing instructions related to the different modes of engine combustion operation. The controller may be communicatively coupled to a fuel delivery system, an air boost system, an intake valve at a combustion chamber, an exhaust valve at a combustion chamber. The controller may be communicatively coupled to a device configured to send a data reading requesting a change in engine combustion operation.

The controller may be communicatively coupled to various sensors at the combustion engine, such as an engine speed sensor, an engine temperature sensor, and an engine torque sensor. The engine speed sensor may be configured to detect the speed of the engine in revolutions per minute. The engine temperature sensor may be configured to detect the temperature of the engine and, more specifically, the oil in the engine. The engine torque sensor may be configured to detect a torque at the engine output.

The controller may be configured to select an engine combustion mode based on data readings from the engine speed sensor. For example, the controller may be configured to select a low temperature combustion mode based on the data readings from the engine speed sensor having an engine speed value less than a predetermined engine speed value. The controller may be configured to select an engine combustion mode based on data readings from the engine temperature sensor. For example, the controller may be configured to select a spark ignition mode based on the data readings from the engine temperature sensor having an engine temperature value less than a predetermined engine temperature value. The controller may be configured to select an engine combustion mode based on data readings from the engine torque sensor. For example, the controller may be configured to select a diffusion flame mode based on data readings from the engine torque sensor being greater than a predetermined engine torque value.

The controller may be configured to select a spark ignition mode. The spark ignition mode may include instructions to apply a spark to combust fuel in the combustion chamber. The spark ignition mode may be selected by the controller based on the combustion engine being colder than a predetermined temperature. The spark ignition mode may be selected based on low load conditions on the combustion engine and the engine temperature falling below a threshold engine temperature. The low load conditions may be indicative of an engine speed being less than a predetermined engine speed or an engine torque being less than a predetermined engine torque.

The controller may be configured to select a low temperature combustion mode. The low temperature mode may include instructions to increase a delay between an intake valve opening duration and an exhaust valve opening duration. The delay may trap burned combustion gases in the combustion chamber and induce an increased compression temperature. The increased compression temperature may induce an auto-ignition of fuel at a delayed compression stroke. The low temperature combustion mode may be selected based on low load conditions of the combustion engine and the engine temperature satisfying a threshold engine temperature. The low load conditions are indicative of an engine speed less than a predetermined engine speed and an engine torque less than a predetermined engine torque, the auto-ignition of fuel does not require a spark in the combustion chamber.

During the low temperature combustion mode, the continuous variable valve duration mechanism or the continuous variable valve timing mechanism may adjust the duration and timing of intake and exhaust valves such that a negative valve overlap exists. A negative valve overlap exists when a delay in time occurs between the intake valve closing and the exhaust valve opening. In other words, the low temperature combustion mode may decrease the intake valve open duration and the exhaust valve open duration such that a time delay exists between the intake valve duration and the exhaust valve open duration. Additionally, the low temperature combustion mode may shift the timing of the intake valve open duration and the timing of the exhaust valve open duration such that a delay in time exists between when the intake valve closes and when the exhaust valve opens.

Further, the controller may be configured to select a diffusion flame mode. The diffusion flame mode may include instructions to decrease or eliminate a delay between an intake valve opening duration and an exhaust valve opening duration. The diffusion flame mode may increase air trapped in the combustion chamber in comparison to the low temperature combustion mode. The diffusion flame mode may include instructions to apply direct injection of fuel into the combustion chamber for compression-ignited combustion. The diffusion flame mode may be selected by the controller based on high load conditions of the combustion engine.

The high load conditions may be indicative of an engine speed being greater than a predetermined engine speed or an engine torque being greater than a predetermined engine torque. The diffusion flame mode may reduce fuel viscosity in comparison to the low temperature combustion mode and may increase fuel spray atomization and vaporization in comparison to the low temperature combustion mode.

During the diffusion flame mode, the continuous variable valve duration mechanism or the continuous variable valve timing mechanism may adjust the duration and timing of intake and exhaust valves such that a positive valve overlap exists. A positive valve overlap exists when an overlap in time exists during which the intake valve is open and the exhaust valve is open. In other words, the diffusion flame mode may extend the intake valve open duration and the exhaust valve open duration such that the intake valve duration and the exhaust valve open duration overlap in time. Additionally, the diffusion flame mode may shift the timing of the intake valve open duration and the timing of the exhaust valve open duration such that an overlap in time exists between when the intake valve closes and when the exhaust valve opens.

Figure 2:
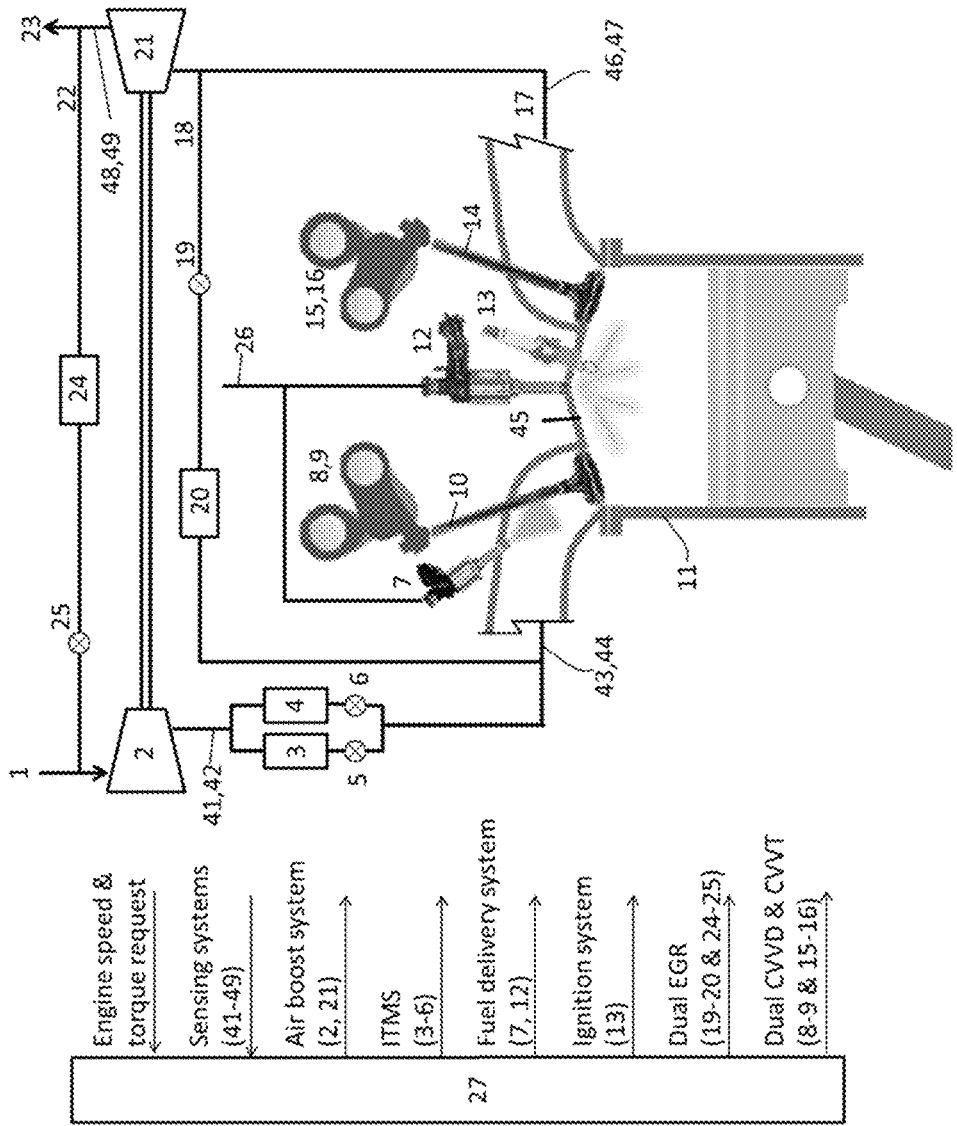
FIG. 2 depicts an example of a signal diagram for controlling fuel and air delivered to a combustion chamber.

FIG. 2 depicts an example of a signal diagram for controlling fuel and air delivered to a combustion chamber. The signal diagram maps an air boost system, an intake air management system, an exhaust gas recirculation system, a continuous variable valve duration mechanism, a continuous variable valve timing mechanism, a combustion chamber, a fuel delivery system, an ignition system, a combustion sensing system, and a controller.

The controller may be communicatively coupled to the air boost system, the intake air management system, the exhaust gas recirculation system, the continuous variable valve duration mechanism, the continuous variable valve timing mechanism, the combustion chamber, the fuel delivery system, the ignition system, and the combustion sensing system to send instructions to a component according to an engine combustion mode. For example, the controller may be configured to operate the fuel delivery system to directly inject fuel in the combustion chamber at a high pressure during a diffusion flame mode.

The controller may be configured to transmit instructions to the air boost system for operation thereof. The air boost system may include a turbocharger. The turbocharger may be a single stage VIC/VNT turbocharger or some combination of turbocharger (e.g., dual turbocharger system, or a mechanical or electrical supercharger. The air boost system may be configured to receive exhaust from the engine and recirculate the air intake back into the combustion engine. The controller may be configured to operate the air boost system to increase the air delivered to the combustion chamber. For example, the controller may be configured to increase the air intake at the combustion chamber when transitioning from the spark ignition mode to the low temperature combustion mode.

The controller may be configured to transmit instructions to the intake air management system for operation thereof. The intake air management system may be configured to adjust the amount of air delivered to the compression chamber. An increase in the air delivered to the compression chamber creates a leaner fuel-to-air mixture. The intake air management system may include a dual charge air heater and air cooler. The controller may be configured to operate the intake air management system to increase the air delivered to the combustion chamber. For example, the controller may be configured to increase the air intake at the combustion chamber when transitioning from the spark ignition mode to the low temperature combustion mode.

The controller may be configured to transmit instructions to the continuous variable valve duration mechanism for operation thereof. The continuous variable valve duration mechanism may be configured to adjust the duration and timing of intake and exhaust valves based on the instructions from the controller. For example, the controller may be configured to operate the continuous variable valve duration mechanism to create a negative valve overlap by creating a delay in time between the intake valve closing and the exhaust valve opening. In other words, the controller may be configured to operate the continuous variable valve duration mechanism to decrease the intake valve open duration and the exhaust valve open duration such that a time delay exists between the intake valve duration and the exhaust valve open duration.

Additionally, the controller may be configured to transmit instructions to the continuous variable valve timing mechanism. The continuous variable valve timing mechanism may be configured to adjust the duration and timing of intake and exhaust valves such that a positive valve overlap exists based on the instructions from the controller. For example, the controller may be configured to operate the continuous variable valve timing mechanism to create a positive valve overlap by creating an overlap in time during which the intake valve is open and the exhaust valve is open. In other words, the controller may be configured to operate the continuous variable valve timing mechanism to extend the intake valve open duration and the exhaust valve open duration such that the intake valve duration and the exhaust valve open duration overlap in time.

Further, the controller may be configured to transmit instructions to the fuel delivery system for operation thereof. The fuel delivery system may include a high-pressure direct injector and a low-pressure fuel injector in the combustion chamber. The controller may be configured to interrupt a fuel supply at the fuel delivery system or increase a fuel supply at the fuel delivery system. For example, the controller may be configured to direct the high-pressure direct injector to increase fuel supply during a diffusion flame mode.

The controller may be configured to transmit instructions to the ignition system for operation thereof. The ignition system may be configured to generate a spark that ignites fuel in the combustion chamber. The spark may be generated with a spark plug or a high energy plasma ignitor or a pre-chamber spark plug. The controller may be configured to operate the ignition system to deliver a spark at the combustion chamber. For example, the controller may be configured to operate the spark plug to ignite the fuel during a spark ignition mode.

Figure 3:
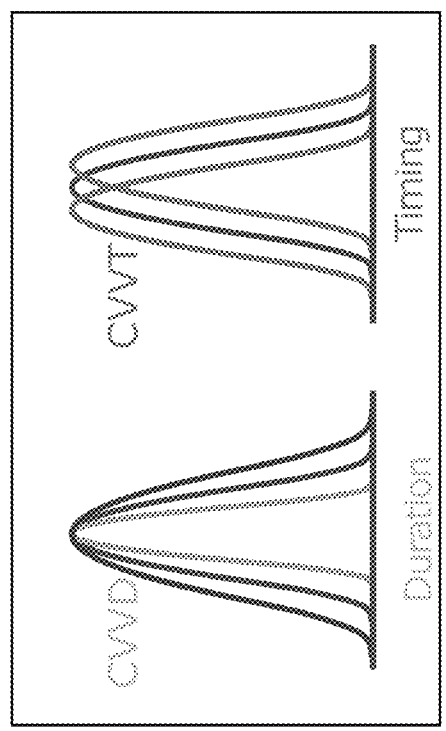
FIG. 3 depicts an example of a graph illustrating continuous variable valve duration and continuous variable valve timing.

FIG. 3 depicts an example of a graph illustrating continuous variable valve duration and continuous variable valve timing. The time during which the intake valve or the exhaust valve is open may be adjusted. For example, an exhaust valve may be open for a longer period of time in one combustion mode compared to another combustion mode. In another example, an intake valve may be open for a shorter period of time in one combustion mode compared to another combustion mode. Varying the time during which the valves are open may be representative of continuous variable valve duration functionality. Generally, continuous variable valve duration functionality may enable the controller to adjust the duration for which an intake valve is opened or an exhaust valve is open. The continuous variable valve duration may be operated by a continuous variable valve duration mechanism.

The time at which the intake valve opens or the exhaust valve closes may be adjusted. For example, the closing of an exhaust valve may be delayed in one combustion mode compared to another combustion mode. In another example, the opening of the intake valve may be delayed in one combustion mode compared to another combustion mode. Varying the timing of the valves opening and closing may be representative of continuous variable valve duration functionality. Generally, the continuous variable valve timing functionality enable the controller to adjust a time at which an intake valve is opened or an exhaust valve is opened. The continuous variable valve timing may be operated by a continuous variable valve timing mechanism.

Figure 4:
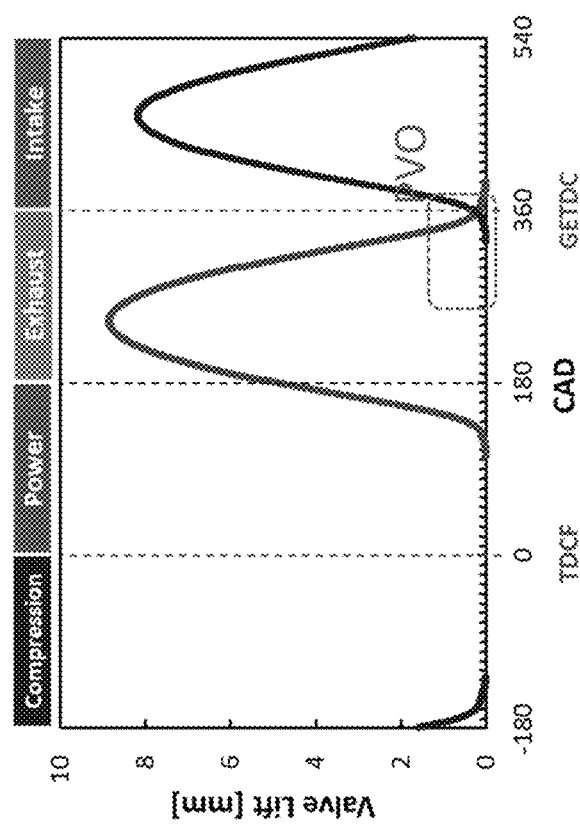
FIG. 4 depicts an example of a graph illustrating a positive valve overlap.

The combustion engine may have a valve train system that operates the continuous variable valve duration mechanism and the continuous variable valve timing mechanism. The mechanisms may be configured to execute timing and duration profiles independently of the position of the piston in the cylinder. The continuous variable valve duration mechanism may be configured to execute duration profiles independent of the position of the piston in the cylinder and the continuous variable valve timing mechanism FIG. 4 depicts an example of a graph illustrating a positive valve overlap. The continuous variable valve duration mechanism or the continuous variable valve timing mechanism may adjust the duration and timing of intake and exhaust valves such that a positive valve overlap exists. A positive valve overlap exists when an overlap in time exists during which the intake valve is open and the exhaust valve is open. In other words, a combustion mode may extend the intake valve open duration and the exhaust valve open duration such that the intake valve duration and the exhaust valve open duration overlap in time. Additionally, the combustion mode may shift the timing of the intake valve open duration and the timing of the exhaust valve open duration such that an overlap in time exists between when the intake valve closes and when the exhaust valve opens.

Figure 5:
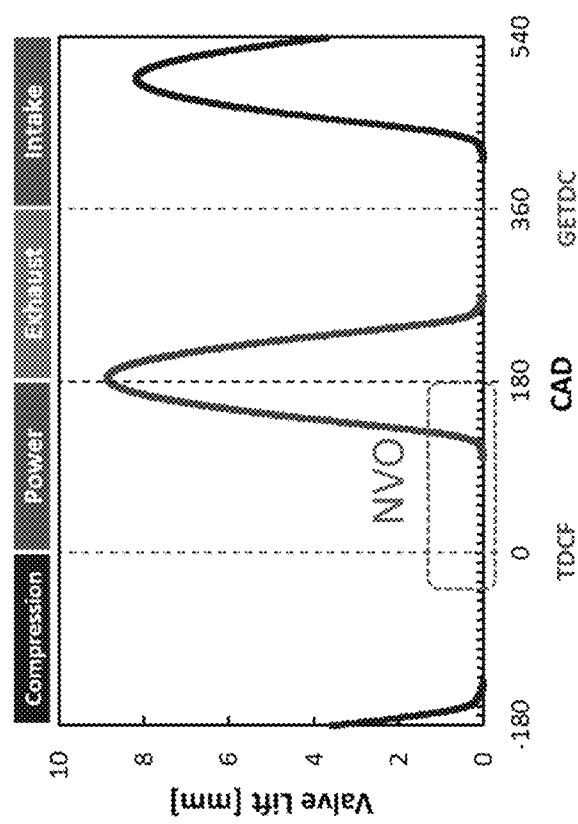
FIG. 5 depicts an example of a graph illustrating a negative valve overlap.

FIG. 5 depicts an example of a graph illustrating a negative valve overlap. The continuous variable valve duration mechanism or the continuous variable valve timing mechanism may be configured to adjust the duration and timing of intake and exhaust valves such that a negative valve overlap exists. A negative valve overlap exists when a delay in time occurs between the intake valve closing and the exhaust valve opening. In other words, the combustion mode may shorten the intake valve open duration and the exhaust valve open duration such that a time delay exists between the intake valve duration and the exhaust valve open duration. Additionally, the combustion mode may shift the timing of the intake valve open duration and the timing of the exhaust valve open duration such that a delay in time exists between when the intake valve closes and when the exhaust valve opens.

Figure 6:
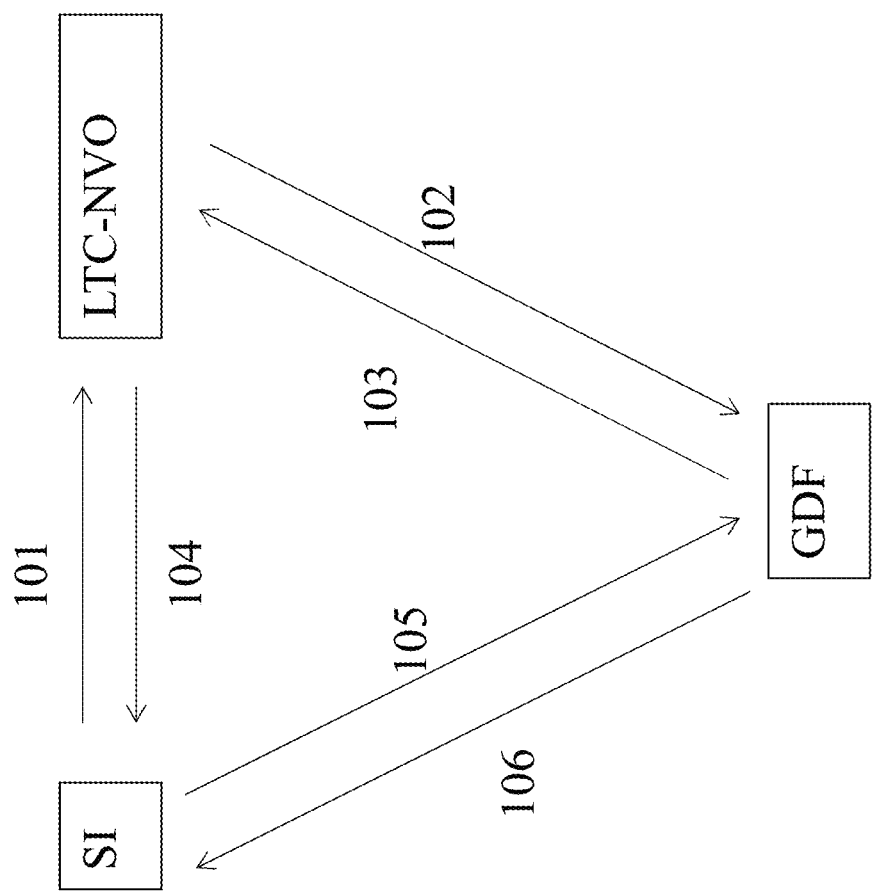
FIG. 6 depicts an example of a graph representative of the changes in combustion operation as the engine transitions from one combustion mode to another.

FIG. 6 depicts an example of a graph representative of the changes in combustion operation as the engine transitions from one combustion mode to another. The change in combustion modes may be a normal switching procedure or a fast switching procedure. The normal switching procedures of 101-104 may be used for the operating conditions in which a normal or slow engine transient rate of energy demand on the engine. This allows the engine to further harness the fuel efficiency and emissions benefits of the low temperature combustion mode. The fast switching procedures of 105-106 may be used for operating conditions in which a high transient rate of energy demands is necessary. The stored multiple combustion modes may have overlapped operating ranges for any two combustion modes. This allows smooth mode transition between any two modes.

At 101, the controller may be configured to switch from a spark ignition mode to a low temperature combustion mode. During the transition to the low temperature combustion mode, the throttle may be opened to increase the air going into the combustion chamber. The increased air flowing into the combustion chamber leans out the fuel-to-air mixture. Additionally, the controller may be configured to adjust the continuous variable valve duration mechanism to create a negative valve overlap. The negative valve overlap may increase the hot residuals and the air trapped in the combustion chamber. This, in turn, may increase the temperature of the fuel-to-air mixture. The start of injection and the amount of direct injection may be adjusted and the amount of direct injection may be adjusted by monitoring the crank angle at which about 50% of the heat from combustion has been released. In some cases, the spark ignition may be maintained to have a more stable low temperature combustion.

In some embodiments, the controller may be configured to select a spark ignition mode based on the combustion engine being colder than a predetermined engine temperature and low load conditions on the combustion engine. The controller may be configured to apply a spark to combust fuel in the combustion chamber. Over time, the fuel combustion increases the temperature of the engine. The controller may be configured to select the low temperature combustion mode in response to the combustion engine being warmer than the predetermined engine temperature. The controller may be configured to reduce an overlap time duration in which the intake valve open duration overlaps with the exhaust valve open duration. The controller may be configured to increase air entering the combustion chamber and adjust a direct injection timing and a direct injection amount.

At 102, the controller may be configured to switch from a low temperature combustion mode to a diffusion flame mode. During the transition to the diffusion flame mode, the controller may be configured to adjust the continuous variable valve duration mechanism to create a positive valve overlap. The positive valve overlap may increase the trapped air in the combustion chamber in comparison to the low temperature combustion mode. The diffusion flame mode may include instructions to apply direct injection of fuel into the combustion chamber for compression-ignited combustion. The controller may be configured to adjust the intake air temperature, the air boost, the exhaust gas recirculation, and increase the direct injection. The controller may be configured to instruct the fuel delivery system to apply multiple fuel injections with delayed start of injection.

In some embodiments, the controller may be configured to select a diffusion flame mode including instructions to apply direct injection of fuel into the combustion chamber for compression ignited combustion in response to high load conditions on the combustion engine. The high load conditions may be indicative of an engine speed being greater than a predetermined engine speed or an engine torque being greater than a predetermined engine torque. The controller may be configured to operate the continuous variable valve duration mechanism to reduce the delay between the intake valve open duration and the exhaust valve open duration to overlay the intake valve open duration and the exhaust valve open duration. The intake valve displacement and the exhaust valve displacement in the diffusion flame mode may be greater than the intake valve displacement and the exhaust valve displacement in the low temperature combustion mode At 103, the controller may be configured to switch from the diffusion flame mode to the low temperature combustion mode. During the transition to the low temperature combustion mode, the controller may be configured to reduce the positive valve overlap and create a negative valve overlap. The negative valve overlap may increase the hot residuals and the air trapped in the combustion chamber. This, in turn, may increase the temperature of the fuel-to-air mixture. Additionally, the controller may be configured to adjust fuel injection from multiple delayed direct injections to early fuel injections with low-pressure fuel injection. The controller may be configured to adjust the intake air temperature, the air boost, and the exhaust gas recirculation by monitoring the crank angle at which 50% of the heat from combustion has been released.

In some embodiments, the controller may be configured to select a low temperature combustion mode in response to low load conditions on the combustion engine. The controller may be configured to select the low temperature combustion mode following the diffusion flame mode. The controller may be configured to operate the continuous variable valve duration mechanism to reduce an overlap time duration in which the intake valve open duration overlaps with the exhaust valve open duration At 104, the controller may be configured to switch from a low temperature combustion mode to a spark ignition mode. During the transition to the spark ignition mode, the controller may be configured to reduce the negative valve overlap and create a positive valve overlap. The controller may be configured to operate the ignition system to generate sparks with a delayed timing. Additionally, the controller may be configured to adjust the throttle, the fuel injection timing, the spark timing, the intake air temperature, the exhaust gas recirculation to have stable combustion by monitoring the crank angle at which about 50% of the heat from combustion has been released while maintaining the requested torque.

At 105, the controller may be configured to switch from a spark ignition mode to a diffusion flame mode. During the transition to the diffusion flame mode, the controller may be configured to open the throttle to allow more air flowing into the combustion chamber. The controller may also be configured to adjust the air boost, the intake air temperature, and the fuel injection quantity and timing from an early low-pressure injection to a delayed high-pressure injection. This results in generating a stratified fuel distribution and auto-ignition by monitoring the crank angle at which about 50% of the heat from combustion has been released. The controller may be configured to operate the ignition system to reduce the spark timing and to turn off the spark in response to the controller determining that the spark does not affect the crank angle at which about 50% of the heat from combustion has been released.

At 106, the controller may be configured to switch from a diffusion flame mode to a spark ignition mode. During the transition to the spark ignition mode, the controller may be configured to adjust the throttle to modify the air flowing into the combustion chamber. The controller may be configured to instruct the ignition system to generate sparks with a delayed timing. The controller may be configured to adjust the spark timing by monitoring the crank angle at which 50% of the heat from combustion has been released. The controller may be configured to operate the fuel injection system to transition from delayed fuel injections to early fuel injections.

FIG. 7 depicts an example of a table representative of the changes in combustion operation as the engine transitions from one combustion mode to another. In some embodiments, when transitioning from spark ignition mode to low temperature combustion with negative valve overlap mode, the throttle is opened to lean out the fuel-to-air mixture while reducing valve overlap from positive valve overlap to negative valve overlap to increase trapping in-cylinder hot residuals from previous combustion cycle. The controller may be configured to adjust injection timing and amount, boost, intake temperature, negative valve overlap to ensure stable combustion by monitoring the crank angle at which about 50% of the heat from combustion has been released while maintaining the requested torque.

In some embodiments, when transitioning from low temperature combustion mode to diffusion flame mode, the controller may be configured to adjust valve overlap from negative valve overlap to positive valve overlap to increase trapped air. The controller may be configured to adjust the intake air temperature, air boost, exhaust gas recirculation, increase direct injection, and use multiple injections with delayed timing.

In some embodiments, when transitioning from diffusion flame mode to low temperature combustion mode, reducing valve overlap from positive valve overlap to negative valve overlap to increase in-cylinder hot residuals and mixture temperature while adjusting fuel injection from high-pressure multiple late direction injection to early fuel injection with low fuel injection pressure. The controller may be configured to adjust intake air temperature, boost, and exhaust gas recirculation to have stable combustion by monitoring the crank angle at which about 50% of the heat from combustion has been released while maintaining the requested torque.

In some embodiments, when transitioning from low temperature combustion mode to spark ignition mode, the controller may be configured to perform spark starting with a delayed timing while increasing valve overlap from negative valve overlap to positive valve overlap. The controller may be configured to adjust the throttle, fuel injection timing, spark timing, intake air temperature, exhaust gas recirculation to have stable combustion by monitoring the crank angle at which about 50% of the heat from combustion while maintaining the requested torque.

In some embodiments, when transitioning from spark ignition mode to diffusion flame mode, the controller may be configured to open up the throttle. The controller may also be configured to adjust boost, intake air temperature, and the fuel injection quantity and timing from early low-pressure injection to high pressure multiple late injections. This may generate stratified fuel distribution and auto-ignition. The controller may be configured to retard spark timing and turn off the spark ignition when it does not affect combustion.

In some embodiments, when transitioning from spark ignition mode to diffusion flame mode, the controller may be configured to adjust the throttle and the boost. In addition, the controller may be configured to initiate spark starting with a late timing. The controller may be configured to adjust spark timing while monitoring combustion phasing and changing the fuel injection to early fuel injection from late fuel injection until the late fuel injection is turned off.

Figure 8:
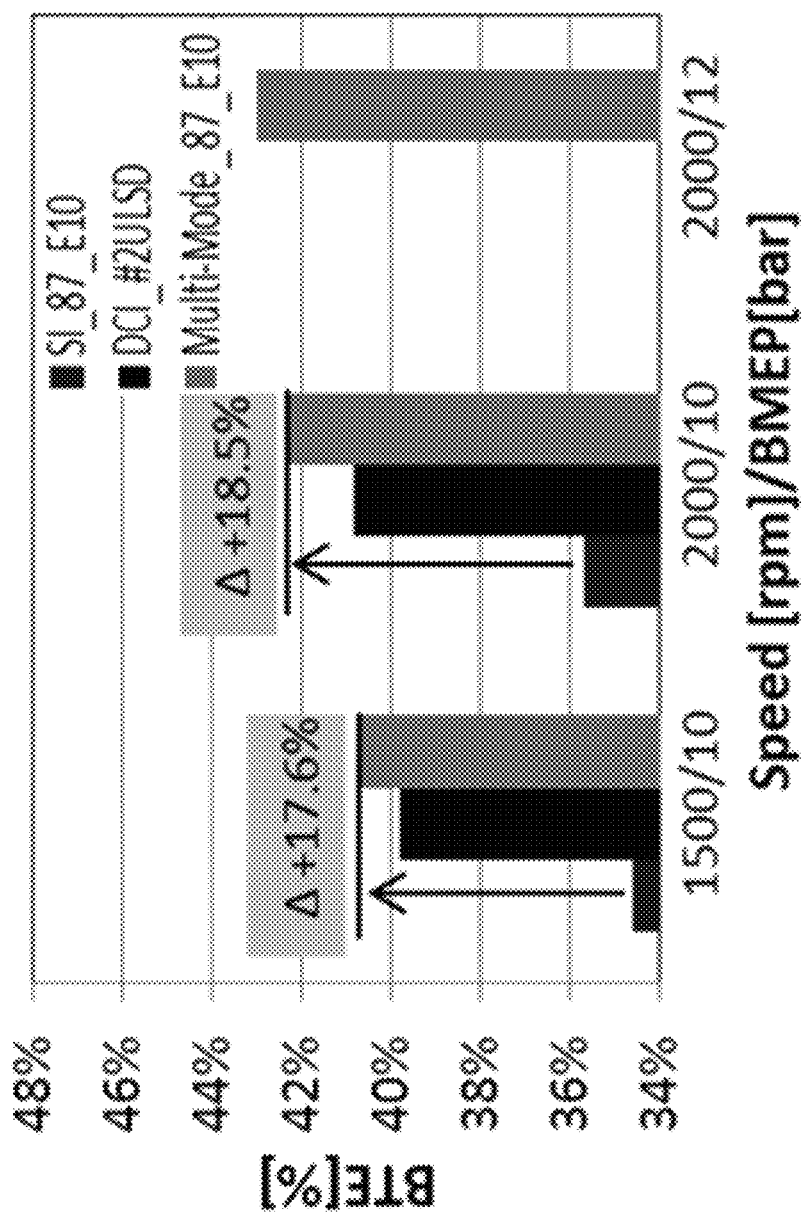
FIG. 8 depicts an example of a chart illustrating the increased efficiency of an engine with a controller selecting different modes of engine operation.

FIG. 8 depicts an example of a chart illustrating the increased efficiency of an engine with a controller selecting different modes of engine operation. The engine efficiency may increase as the controller selects between the different combustion modes. For example, the engine efficiency may increase by about 15% in comparison to conventional gasoline spark-ignited engines. As depicted, the brake thermal efficiency may increase as the controller selects between the different combustion modes in comparison to conventional gasoline spark-ignited engines. The carbon dioxide and soot emissions may decrease as the controller selects between the different combustion modes in comparison to conventional gasoline spark-ignited engines.

Figure 9:
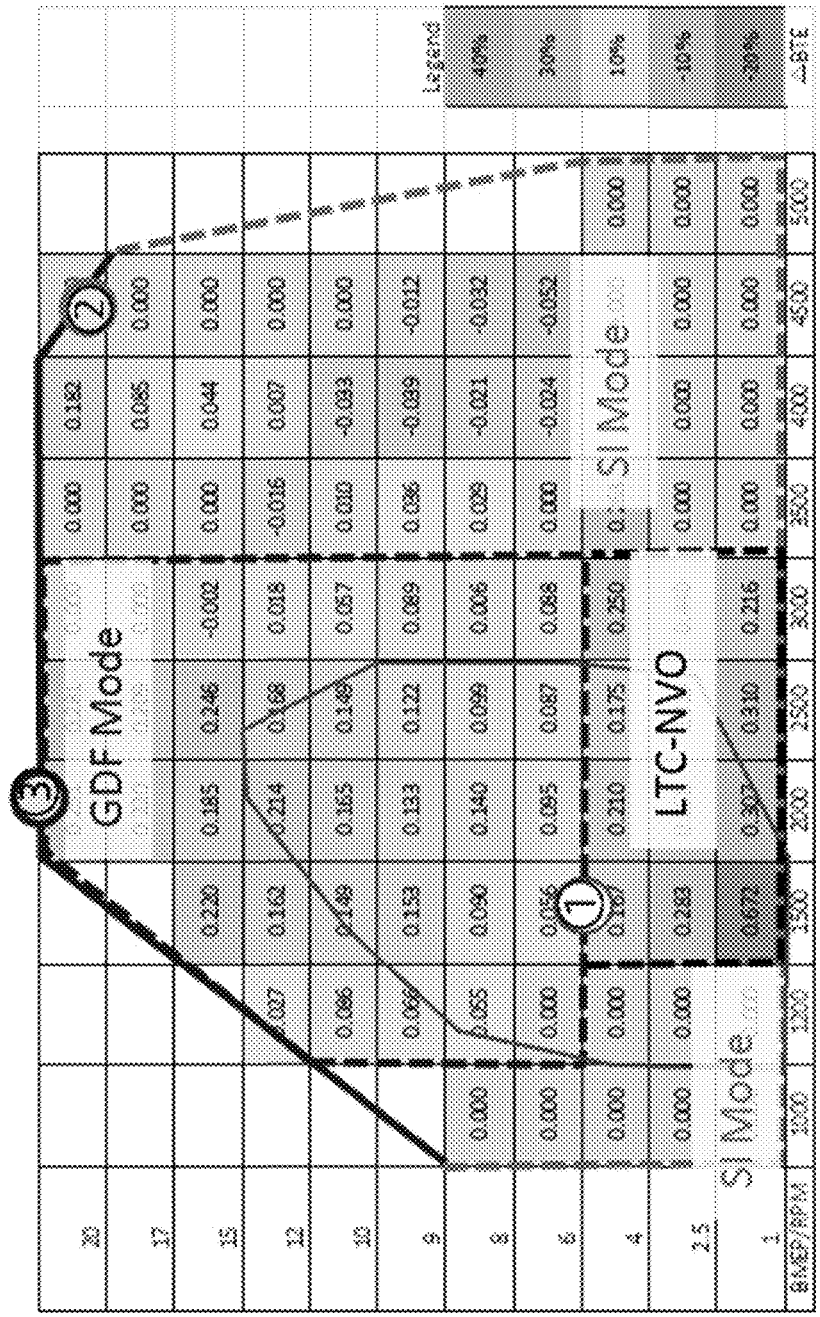
FIG. 9 depicts an example of a table illustrating the increased efficiency of an engine with a controller selecting different modes of engine operation.

FIG. 9 depicts an example of a table illustrating the increased efficiency of an engine with a controller selecting different modes of engine operation based on an engine speed and an engine load. The engine efficiency may increase as the controller selects between the different combustion modes. For example, the engine efficiency may increase by about 15% in comparison to conventional gasoline spark-ignited engines. As depicted, the brake thermal efficiency may increase as the controller selects between the different combustion modes in comparison to conventional gasoline spark-ignited engines. The carbon dioxide and soot emissions may decrease as the controller selects between the different combustion modes in comparison to conventional gasoline spark-ignited engines.

Figure 10:
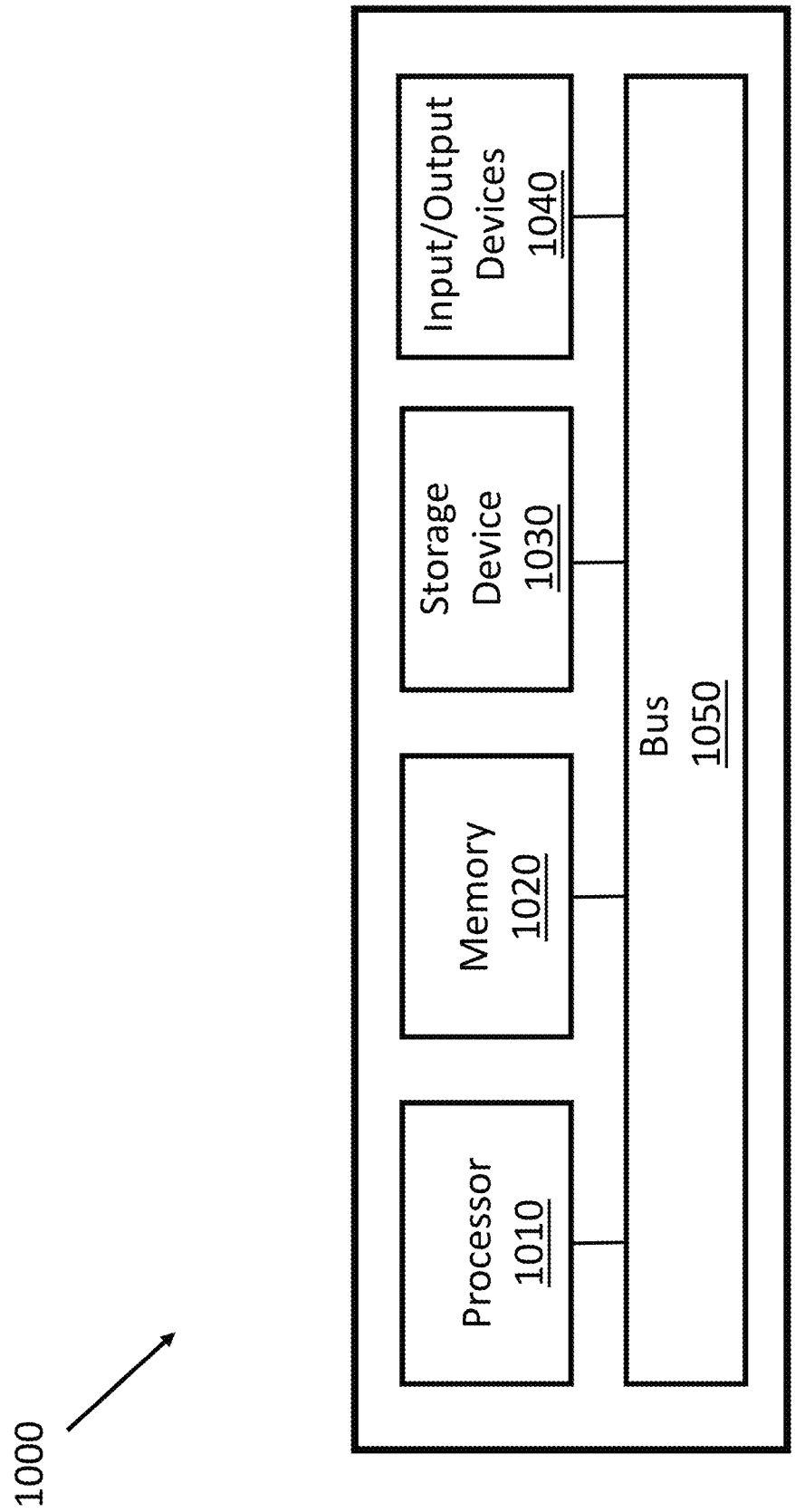
FIG. 10 depicts a block diagram illustrating a computing system consistent with implementations of the current subject matter.

FIG. 10 depicts a block diagram illustrating a computing system 1000 consistent with implementations of the current subject matter. Referring to FIGS. 1-10, the computing system 1000 may be used to select between different combustion modes. For example, the computing system 1000 may implement a user equipment, a personal computer, or a mobile device.

As shown in FIG. 10, the computing system 1000 may include a processor 1010, a memory 1020, a storage device 1030, and an input/output device 1040. The processor 1010, the memory 1020, the storage device 1030, and the input/output device 1040 may be interconnected via a system bus 1050. The processor 1010 is capable of processing instructions for execution within the computing system 1000. Such executed instructions may implement one or more components of, for example, cross-cloud code detection. In some example embodiments, the processor 1010 may be a single-threaded processor. Alternately, the processor 1010 may be a multi-threaded processor. The processor 1010 is capable of processing instructions stored in the memory 1020 and/or on the storage device 1030 to display graphical information for a user interface provided via the input/output device 1040.

The memory 1020 is a non-transitory computer-readable medium that stores information within the computing system 1000. The memory 1020 may store data structures representing configuration object databases, for example. The storage device 1030 is capable of providing persistent storage for the computing system 1000. The storage device 1030 may be a floppy disk device, a hard disk device, an optical disk device, or a tape device, or other suitable persistent storage means. The input/output device 1040 provides input/output operations for the computing system 1000. In some example embodiments, the input/output device 1040 includes a keyboard and/or pointing device. In various implementations, the input/output device 1040 includes a display unit for displaying graphical user interfaces.

According to some example embodiments, the input/output device 1040 may provide input/output operations for a network device. For example, the input/output device 1040 may include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 1000 may be used to execute various interactive computer software applications that may be used for organization, analysis and/or storage of data in various formats. Alternatively, the computing system 1000 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing items and/or functionalities. Upon activation within the applications, the functionalities may be used to generate the user interface provided via the input/output device 1040. The user interface may be generated and presented to a user by the computing system 1000 (e.g., on a computer screen monitor, etc.).

The technical advantages presented herein may result in significant combustion efficiency and vehicle fuel economy while maintaining low tailpipe out emissions. Increased fuel economy removes the negative externalities of the vehicle on the environment and makes the vehicle travel further on the same amount of fuel.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system comprising:
 a combustion engine having a combustion chamber with an intake valve and an exhaust valve; and
 a fuel delivery system;
 a controller communicatively coupled to the combustion engine and the fuel delivery system, the controller configured to:
  select a low temperature combustion mode based on the combustion engine being warmer than a predetermined temperature and low load conditions on the combustion engine, the low temperature combustion mode including instructions that reduces an intake valve opening duration and an exhaust valve opening duration; and
  in response to selecting the low temperature combustion mode, reduce the intake valve opening duration and the exhaust valve opening duration to create a delay between the intake valve opening duration and the exhaust valve opening duration,
  wherein the delay increases a fuel temperature in the combustion chamber and induces auto-ignition of fuel in the combustion chamber.

2. The system of claim 1, wherein the delay traps burned combustion gases in the combustion chamber inducing an increased compression temperature and the auto-ignition of fuel is induced at a delayed compression stroke.

3. The system of claim 1, wherein the low load conditions are indicative of an engine speed less than a predetermined engine speed and an engine torque less than a predetermined engine torque, the auto-ignition of fuel does not require a spark in the combustion chamber.

4. The system of claim 1, wherein the controller is configured to:
 select a spark ignition mode based on the combustion engine being colder than the predetermined temperature and the low load conditions on the combustion engine, the spark ignition mode including instructions to apply a spark to combust fuel in the combustion chamber; and
 in response to the combustion engine being warmer than the predetermined temperature, select the low temperature combustion mode.

5. The system of claim 1, wherein the controller is configured to:
in response to high load conditions on the combustion engine, select a diffusion flame mode including instructions to apply direct injection of fuel into the combustion chamber for compression ignited combustion, the high load conditions being indicative of an engine speed greater than a predetermined engine speed and an engine torque being greater than a predetermined engine torque.

6. The system of claim 5, wherein the instructions further include:
increase the intake valve opening duration and the exhaust valve opening duration to reduce the delay between the intake valve open duration and the exhaust valve open duration,
wherein an intake valve displacement and an exhaust valve displacement in the diffusion flame mode are greater than the intake valve displacement and the exhaust valve displacement in the low temperature combustion mode.

7. The system of claim 5, wherein the diffusion flame mode increases air trapped in the combustion chamber in comparison to the low temperature combustion mode, reduces fuel viscosity in comparison to the low temperature combustion mode, and increases fuel spray atomization and vaporization in comparison to the low temperature combustion mode.

8. The system of claim 1, wherein the controller is configured to:
selecting a diffusion flame mode including instructions to apply direct injection for compression ignited combustion; and
in response to the low load conditions on the combustion engine, select the low temperature combustion mode including instructions to reduce an overlap time duration in which the intake valve open duration overlaps with the exhaust valve open duration.

9. The system of claim 1, wherein the controller is configured to:
select a spark ignition mode based on low load conditions and the combustion engine being colder than the predetermined temperature; and
in response to selecting the low temperature combustion mode, reducing an overlap time duration in which the intake valve open duration overlaps with the exhaust valve open duration.

10. The system of claim 9, wherein the controller is configured to:
in response to selecting the low temperature combustion mode, increase air entering the combustion chamber and adjust a direct injection timing and a direct injection amount.

11. A non-transitory computer-readable storage medium storing instructions that, when executed by a processor, cause the processor to perform operations comprising:
select a low temperature combustion mode based on a combustion engine being warmer than a predetermined temperature and low load conditions on the combustion engine, the low temperature combustion mode including instructions that reduces an intake valve opening duration and an exhaust valve opening duration; and
in response to selecting the low temperature combustion mode, reduce the intake valve opening duration and the exhaust valve opening duration to create a delay between the intake valve opening duration and the exhaust valve opening duration,
wherein the delay increases a fuel temperature in the combustion chamber and induces auto-ignition of fuel in the combustion chamber.

12. The non-transitory computer-readable storage medium of claim 11, wherein the delay traps burned combustion gases in the combustion chamber inducing an increased compression temperature and the auto-ignition of fuel is induced at a delayed compression stroke.

13. The non-transitory computer-readable storage medium of claim 11, wherein the low load conditions are indicative of an engine speed less than a predetermined engine speed and an engine torque less than a predetermined engine torque, the auto-ignition of fuel does not require a spark in the combustion chamber.

14. The non-transitory computer-readable storage medium of claim 11, the operations further comprising:
select a spark ignition mode based on the combustion engine being colder than the predetermined temperature and the low load conditions on the combustion engine, the spark ignition mode including instructions to apply a spark to combust fuel in the combustion chamber; and
in response to the combustion engine being warmer than the predetermined temperature, select the low temperature combustion mode.

15. The non-transitory computer-readable storage medium of claim 11, the operations further comprising:
in response to high load conditions on the combustion engine, select a diffusion flame mode including instructions to apply direct injection of fuel into the combustion chamber for compression ignited combustion, the high load conditions being indicative of an engine speed greater than a predetermined engine speed and an engine torque being greater than a predetermined engine torque.

16. The non-transitory computer-readable storage medium of claim 15, wherein the instructions further include:
increase the intake valve opening duration and the exhaust valve opening duration to reduce the delay between the intake valve open duration and the exhaust valve open duration,
wherein an intake valve displacement and an exhaust valve displacement in the diffusion flame mode are greater than the intake valve displacement and the exhaust valve displacement in the low temperature combustion mode.

17. The non-transitory computer-readable storage medium of claim 15, wherein the diffusion flame mode increases air trapped in the combustion chamber in comparison to the low temperature combustion mode, reduces fuel viscosity in comparison to the low temperature combustion mode, and increases fuel spray atomization and vaporization in comparison to the low temperature combustion mode.

18. The non-transitory computer-readable storage medium of claim 11, the operations further comprising:
selecting a diffusion flame mode including instructions to apply direct injection for compression ignited combustion; and
in response to the low load conditions on the combustion engine, select the low temperature combustion mode including instructions to reduce an overlap time duration in which the intake valve open duration overlaps with the exhaust valve open duration.

19. The non-transitory computer-readable storage medium of claim 11, the operations further comprising:
- select a spark ignition mode based on low load conditions and the combustion engine being colder than the predetermined temperature; and
- in response to selecting the low temperature combustion mode, reducing an overlap time duration in which the intake valve open duration overlaps with the exhaust valve open duration.

20. A method comprising:
- select a low temperature combustion mode based on a combustion engine being warmer than a predetermined temperature and low load conditions on the combustion engine, the low temperature combustion mode including instructions that reduces an intake valve opening duration and an exhaust valve opening duration; and
- in response to selecting the low temperature combustion mode, reduce the intake valve opening duration and the exhaust valve opening duration to create a delay between the intake valve opening duration and the exhaust valve opening duration,
- wherein the delay increases a residual gas temperature in the combustion chamber and induces auto-ignition of fuel in the combustion chamber.

* * * * *

UNITED STATES PATENT AND TRADEMARK OFFICE
CERTIFICATE OF CORRECTION

| | |
|---|---|
| PATENT NO. | : 11,459,995 B1 |
| APPLICATION NO. | : 17/569068 |
| DATED | : October 4, 2022 |
| INVENTOR(S) | : Antowan Zyada et al. |

It is certified that error appears in the above-identified patent and that said Letters Patent is hereby corrected as shown below:

In the Specification

At Column 1, please add the following paragraph after the Title:
GOVERNMENT LICENSE RIGHTS
This invention was made with government support under Award No. DE-EE0008478 awarded by the U.S. Department of Energy (DOE). The government has certain rights in the invention.

Signed and Sealed this
Eighth Day of November, 2022

*Katherine Kelly Vidal*

Katherine Kelly Vidal
*Director of the United States Patent and Trademark Office*